July 16, 1963 M. L. KERNEY 3,097,810

REEL

Filed Dec. 12, 1961

Myron L. Kerney
INVENTOR.

BY R. Frank Smith
Armin B. Pagel
ATTORNEYS

United States Patent Office 3,097,810

Patented July 16, 1963

3,097,810

REEL

Myron Kerney, Rochester, N.Y., assignor to Eastman Kodak Company, Rochester, N.Y., a corporation of New Jersey Filed Dec. 12, 1961, Ser. No. 158,827
4 Claims. (Cl. 242—71.8)

The present invention relates to reels for magnetic recording tape and more specifically to a molded plastic tape reel provided with a tape splicer formed as an integral part of one of the reel flanges.

The most commonly employed method of splicing magnetic recording tape for purposes of editing or repairing breaks comprises cutting the ends of the tape at a particular angle, abutting the mating ends, applying a strip of pressure sensitive adhesive tape over the joint, and severing the excess adhesive tape along the edges of the spliced recording tape. This operation is facilitated by a splicer block which is customarily provided as a separate accessory which may be attached to the recording machine if desired. Such a splicer block consists essentially of a body member provided with a shallow groove adapted to receive the recording tape and with a transverse groove adapted to guide a blade to sever the tape at a predetermined angle. In order not to affect the magnetic properties of the tape, the body member is generally fabricated from plastic or some other non-magnetic material.

In order to eliminate the expense and inconvenience inherent in the use of a separate device for splicing recording tape, the present invention provides a splicer as an integral part of a tape reel, whereby it will always be readily available for use, and a primary object of the invention is the provision of such structure.

Aside from the unnecessary expense and inconvenience involved in using customary splicing accessories, an additional disadvantage inherent in such devices made from plastic or some other relatively soft material is that they become inaccurate through repeated use because of the softness of the body material relative to the cutting blade employed. It is therefore another object of the invention to eliminate the necessity of replacing such accessories by providing them as integral parts of the tape reels, whereby each device will be used relatively few times in splicing only that tape associated with a particular reel.

Still another object is to incorporate a splicing device into a flange of a reel without in any way interfering with the normal function of the reel.

Another object of the invention is to provide a construction which facilitates the removal of severed portions of the splicing tape from the splicing device.

Yet another object of the invention is to provide such a device which serves to protect a film measuring scale used to determine the amount of tape on a reel.

These and other objects of the invention will be readily apparent from the following description and by reference to the accompanying drawings in which.

Figure 1:
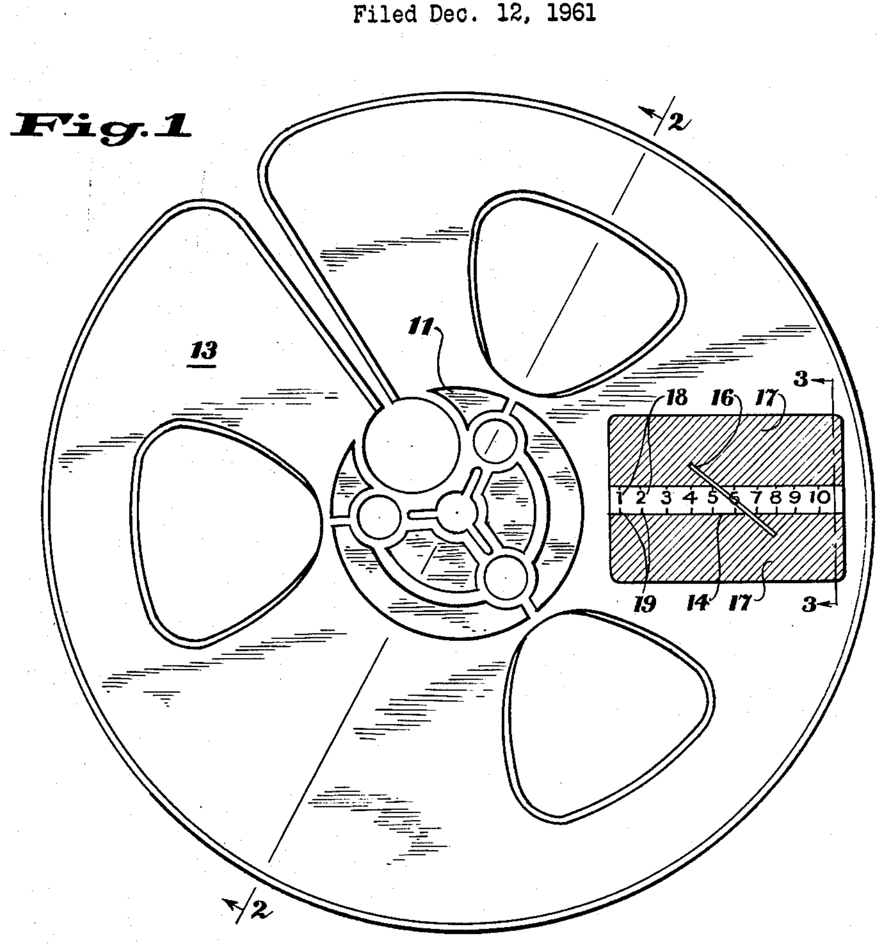
FIG. 1 is a plan view of a magnetic tape reel according to the preferred embodiment of the invention.
Figure 2:
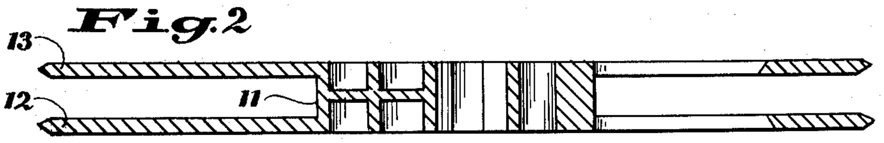
FIG. 2 is a sectional view taken along lines 2—2 of FIG. 1.

As shown in FIGS. 1 and 2, the real comprises a hub designated generally as 11, to which are joined two spaced annular flanges, 12 and 13. Although the illustrated reel is molded in one piece of a transparent plastic material, the invention is of course equally applicable to reels assembled from a number of components formed of plastic or any other suitable material.

Figure 3:
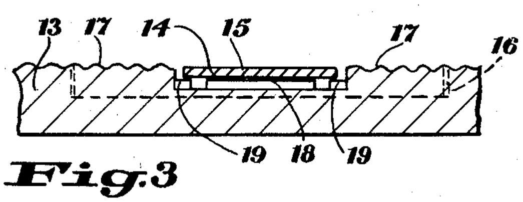
FIG. 3 is a partial sectional view taken along the lines 3—3 of FIG. 1, with a piece of tape shown in splicing position.

The splicing device is located on a flat outer surface of the reel flange as shown in plan view in FIG. 1 and in cross section in FIG. 3 and comprises a shallow channel 14 adapted to receive a portion of the recording tape 15. This groove is slightly wider than the tape and is intersected by a narrow diagonal blade guiding groove 16, which is slightly deeper than the channel. While the groove 16 is shown as being inclined relative to said recess it could just as well extend across the recess at right angles thereto, if a square end splice is desired.

To splice two pieces of recording tape, the ends thereof are laid in the channel either individually or in superposed overlapping relation if two ends are to be trimmed simultaneously, and are trimmed by drawing the cutting edge of a knife or razor blade along the groove. While held in alignment in the channel, the mating ends are then abutted and a strip of pressure sensitive tape is applied over the joint and pressed into firm contact with the recording tape. The excess splicing tape extending beyond the edges of the recording tape is then severed either by drawing the blade along the edges of the channel or by other means after removing the tape from the device.

Since, during the splicing operation, the splicing tape is pressed into engagement with the adjacent flat surfaces of the reel, the tape may adhere to the reel in such manner that it is difficult to lift an edge thereof to initiate removal of the tape. According to the present invention this annoyance has been mitigated by providing the areas of the reel adjacent the channel with a pebbled or otherwise roughened or serrated surface 17, from which an edge of the splicing tape can be readily lifted for removal of the tape.

In addition to serving as a splicing guide, channel 14 also serves to protect tape measuring numerals 18 and reference marks 19, by means of which the amount of tape on the reel may be readily determined. In a molded article such as a reel, such indicia are preferably formed as raised characters because of the relative simplicity of engraving character forming impressions into the mold rather than removing the surrounding material as is dictated if the molded characters are to be depressed. If such raised characters are formed directly on the flat flange surfaces, however, they interfere with stacking the reels and are easily abraded. By locating the indicia in the channel below the surface of the flange, as shown in cross section in FIG. 3, however, the indicia are protected and the flat flange surface is preserved. Furthermore, by forming the characters at the bottom of the channel, the figures and reference lines are in closer proximity to the roll of recording tape, thereby reducing parallax and facilitating accurate reading of the scale.

Since various modifications may be made without departing from the spirit of the invention, the foregoing description is to be considered as illustrative only, the scope of the invention being defined by the following claims.

I claim:

1. A reel adapted to accommodate a coil of information recording web medium, said reel comprising at least one flange having an outwardly facing flat surface in which is formed a shallow channel substantially as wide as said web medium and accessible to said web medium coiled on said reel for receiving a portion of said medium, and a narrow groove slightly deeper than said channel extending thereacross.

2. A molded plastic reel adapted to accommodate a coil of recording tape, said reel comprising at least one transparent flange having an outwardly facing flat surface in which is formed a radially disposed shallow channel substantially as wide as said tape molded as a recess in said surface and accessible to said tape coiled on said reel for receiving a portion of said tape, said channel being provided with molded coil-size-measuring indicia distributed along and raised from the bottom of said channel to a level below said surface, and a narrow groove slightly deeper than said channel and intersecting said channel at a predetermined angle.

3. A reel adapted to accommodate a coil of recording tape, said reel comprising at least one flange having an outwardly facing flat surface in which is recessed a shallow channel substantially as wide as said tape, and a narrow groove slightly deeper than said channel extending diagonally thereacross, said surface being rough in the areas adjacent said channel and said groove.

4. A molded plastic reel adapted to accommodate a coil of recording tape, said reel comprising at least one translucent flange having an outwardly facing flat surface in which is recessed a radially disposed shallow channel substantially as wide as said tape and accessible to said tape coiled on said reel for receiving a portion of said tape, said channel being provided with coil-size-measuring indicia raised from the bottom of said channel to a level below said surface, and a narrow groove intersecting said channel and adapted to guide a blade for severing said tape at a predetermined angle, said surface being rough in the areas adjacent said channel and said groove.

References Cited in the file of this patent

UNITED STATES PATENTS

| | | |
|---|---|---|
| 2,239,222 | Funke | Apr. 22, 1941 |
| 2,438,361 | Doblin et al. | Mar. 23, 1948 |
| 2,476,928 | Thomas | July 19, 1949 |
| 2,575,798 | Dain | Nov. 20, 1951 |

FOREIGN PATENTS

| | | |
|---|---|---|
| 765,366 | Great Britain | Jan. 9, 1957 |